US012369657B2

(12) United States Patent
Crosby

(10) Patent No.: US 12,369,657 B2
(45) Date of Patent: Jul. 29, 2025

(54) PERSONAL PROTECTIVE EQUIPMENT

(71) Applicant: RESPIREX INTERNATIONAL LIMITED, Redhill (GB)

(72) Inventor: Raymond George Crosby, Redhill (GB)

(73) Assignee: RESPIREX INTERNATIONAL LIMITED, Redhill (GB)

( * ) Notice: Subject to any disclaimer, the term of this patent is extended or adjusted under 35 U.S.C. 154(b) by 92 days.

(21) Appl. No.: 18/117,080

(22) Filed: Mar. 3, 2023

(65) Prior Publication Data

US 2024/0251893 A1 Aug. 1, 2024

(30) Foreign Application Priority Data

Jan. 27, 2023 (GB) ..................................... 2301219

(51) Int. Cl.
*A41D 19/015* (2006.01)
*A41D 13/00* (2006.01)
(Continued)

(52) U.S. Cl.
CPC .... *A41D 19/01594* (2013.01); *A41D 13/0005* (2013.01); *A41D 19/002* (2013.01);
(Continued)

(58) Field of Classification Search
CPC .......... A41D 19/01594; A41D 19/0034; A41D 19/0037; A41D 19/0041; A41D 19/0044;
(Continued)

(56) References Cited

U.S. PATENT DOCUMENTS

| | | | | | |
|---|---|---|---|---|---|
| 1,361,565 | A * | 12/1920 | Christy | A41D 19/0041 2/160 |
| 2,558,533 | A * | 6/1951 | Bell | A41D 27/10 2/323 |

(Continued)

FOREIGN PATENT DOCUMENTS

| | | | |
|---|---|---|---|
| GB | 109893 | A | 10/1917 |
| GB | 2555405 | A | 5/2018 |

(Continued)

OTHER PUBLICATIONS

United Kingdom IPO Search Report issued Jul. 19, 2023, in corresponding UK patent application GB2301219.8.

(Continued)

*Primary Examiner* — Khaled Annis
*Assistant Examiner* — Dakota Marin
(74) *Attorney, Agent, or Firm* — MILES & STOCKBRIDGE P.C.

(57) ABSTRACT

An apparatus for providing a seal between a sleeve of a garment and a glove, the apparatus including a cuff body and a glove insert, the cuff body comprising a surrounding wall which defines an internal space, and the cuff body having a first distal open end and a second distal open end, the first distal open end comprising a resiliently deflectable sealing lip, which defines an opening of said first distal end, the glove insert is hollow and has a respective opening at each distal end, the glove insert comprises an outer surface which is provided with a locating channel which extends around the outer surface, the cuff body arranged for attachment to the sleeve of a garment, and the glove insert arranged to be inserted inside a glove, the sealing lip arranged to resiliently engage with glove material within the locating channel and thereby seal against the glove material.

14 Claims, 5 Drawing Sheets

(51) Int. Cl.
*A41D 19/00* (2006.01)
*A62B 17/00* (2006.01)

(52) U.S. Cl.
CPC ...... *A41D 19/0034* (2013.01); *A41D 19/0037* (2013.01); *A41D 19/0041* (2013.01); *A41D 19/0044* (2013.01); *A41D 19/0048* (2013.01); *A41D 19/0089* (2013.01); *A41D 19/015* (2013.01); *A62B 17/00* (2013.01); *A62B 17/001* (2013.01)

(58) Field of Classification Search
CPC ............ A41D 19/0048; A41D 19/0089; A41D 19/015; A41D 19/002; A41D 13/0005; A62B 17/00; A62B 17/001
USPC .............................................................. 2/160
See application file for complete search history.

(56) References Cited

U.S. PATENT DOCUMENTS

| | | | | |
|---|---|---|---|---|
| 4,479,268 | A * | 10/1984 | Tillbrook | A41D 19/0089 2/2.15 |
| 4,733,412 | A * | 3/1988 | Campbell | A41D 19/01529 2/164 |
| 6,006,355 | A * | 12/1999 | Abts | A62B 17/001 2/2.14 |
| 6,523,181 | B2 * | 2/2003 | Medves | A41D 19/0089 2/160 |
| 6,715,159 | B2 * | 4/2004 | Cormier | A41D 13/0005 2/457 |
| 7,269,859 | B2 * | 9/2007 | Wells | A41D 19/0055 2/161.6 |
| 7,434,270 | B1 * | 10/2008 | Bradford | A43B 23/06 2/59 |
| 7,908,673 | B2 * | 3/2011 | Kerr-Maddox | A41D 19/0093 2/163 |
| 8,112,820 | B2 * | 2/2012 | Johnson | A41D 13/0005 2/160 |
| 8,341,768 | B2 * | 1/2013 | Gellerstedt | A41D 19/0089 2/160 |
| 8,677,513 | B2 * | 3/2014 | Mathis | A41D 19/0089 2/125 |
| 10,165,814 | B2 * | 1/2019 | Thompson | A41F 1/002 |
| 10,682,775 | B2 * | 6/2020 | Arethuse | A41D 19/00 |
| 11,064,747 | B2 * | 7/2021 | Zahradka | A41D 27/10 |
| 11,382,365 | B2 * | 7/2022 | Musgrove | A41D 19/0089 |
| 11,386,325 | B1 | 7/2022 | Srinivasan et al. | |
| 2005/0241046 | A1 * | 11/2005 | Griesbach, III | A41D 19/0041 2/160 |
| 2006/0107437 | A1 * | 5/2006 | Griesbach, III | A41D 15/002 2/114 |
| 2018/0352878 | A1 * | 12/2018 | Smith | A41D 13/0005 |
| 2020/0229522 | A1 * | 7/2020 | Kitay | A41D 19/0089 |
| 2020/0329793 | A1 * | 10/2020 | Howell | A41D 13/1227 |
| 2022/0330633 | A1 * | 10/2022 | Bucchi | A41D 13/0005 |

FOREIGN PATENT DOCUMENTS

| | | | |
|---|---|---|---|
| JP | 2003171816 | A | 6/2003 |
| WO | 2012039463 | A1 | 3/2012 |
| WO | 2018076041 | A1 | 5/2018 |

OTHER PUBLICATIONS

Extended European Search Report issued on Aug. 16, 2023 in corresponding European Application No. 23158631.4.

* cited by examiner

PERSONAL PROTECTIVE EQUIPMENT

PRIORITY

This application claims the benefit of United Kingdom Patent Application No. GB 2301219.8, filed on Jan. 27, 2023, in the United Kingdom Intellectual Property Office, which is incorporated herein by reference.

TECHNICAL FIELD

The present invention lies generally in the field of personal protective equipment.

BACKGROUND

Protective clothing is made from a protective material to provide a barrier prevent the ingress of hazardous or harmful substances, such as chemicals, which may be in the liquid form. This type of protective clothing is used in the chemical, pharmaceutical, petrochemical and fire service industries, and may be collectively referred to as Personal Protective Equipment (PPE). Such clothing may take the form of a suit, jacket or coverall which protects the entire body of a wearer, or the upper part of the body of a wearer. Such clothing may be required to meet performance requirements such as a so-called Inward Leakage Test. The test requires that a water jet containing a visible dye tracer is directed at chemical protective overall worn by a test subject. The test involves targeting key areas where leakage could possibly occur, seam crossovers, flaps, seals etc. During the test, each area is jetted at pressure for a required time. Any leakage occurring is captured by staining on the test subject who is wearing a white absorbent overall underneath the suit during the test.

The requirement to wear PPE may include the wearing of protective gloves, in combination with a coverall, suit or jacket. In order to prevent ingress of hazardous material, which may be in liquid state, between a glove and an arm sleeve of, say, a protective suit, it is known to apply adhesive tape around the sleeve and the glove so that a seal is formed. However, this method is cumbersome and does not provide a reliable seal.

The inventor seeks to provide an improved solution for effecting a seal between a sleeve of a garment and a glove.

SUMMARY

One aspect of the invention relates to an apparatus for providing a seal between a sleeve of a garment and a glove, the apparatus comprising: a cuff body and a glove insert; the cuff body may comprise a surrounding wall which defines an internal space, and the cuff body may have a first distal open end and a second distal open end; the first distal open end may comprise a resiliently deflectable sealing lip, which may define an opening of said first distal end: the glove insert may be hollow and may have a respective opening at each distal end; the glove insert may comprise an outer surface which may be provided with a locating channel which may extend around the outer surface: the cuff body may be arranged/configured for attachment to the sleeve of a garment, and the glove insert may be arranged/configured to be inserted inside a glove, the sealing lip may be arranged to resiliently engage with a portion of the glove on the cuff insert within the locating channel and thereby form a liquid seal with the glove.

The integrity of the seal is preferably maintained even when the cuff body undergoes is subjected to some extent of flexure.

By 'seal' the inventor includes substantially or completely preventing the ingress of liquid.

In use, the co-operation between the seal lip and the channel may be viewed as bringing about a lock or mating of the cuff body and the glove insert.

The locating channel may be defined by two spaced apart relief formations. One or each of the relief formations may comprise a rib, ridge, wall or upstand. One or each of the relief formations may be of circular or ring form, and may extend completely around the cuff body. The relief formations may extend outwardly from the outer surface of the glove insert.

The relief formations need not be either continuous or of invariable shape (around the outer surface).

One or each of the relief formations may extend substantially fully around the outer surface.

The relief formations may be spaced apart along a longitudinal extent of the cuff insert. One of the relief formations may be located at or proximal to a distal end of the glove insert.

One of the relief formations may be higher than the other relief surface. That relief formation which is closer to a distal end of the cuff body may be higher than the relief formation which is further away from said distal end. By 'height' we include the outward extent of the respective relief formations, and so one of the relief formations may extend further away than the other.

The locating channel may have a width which is larger than a width of the sealing lip.

The locating channel may be provided towards a distal end of the glove insert.

The glove insert may be of substantially frusto-conical shape.

Where the glove insert is of frusto-conical shape, and so as such comprises a wide end and a narrow end, a front end of the glove insert may be narrower than a rearward end of the glove insert.

The glove insert may be arranged to be received in a cuff portion of a glove.

The resilient sealing lip may be located radially inwardly of the outer surface of the cuff body.

The resilient sealing lip, in an unbiased/undeflected condition, may be orientated at an incline.

The resilient sealing lip may circumscribe an opening of the cuff body. The resilient sealing lip may be of overall circular shape/outline.

The resilient sealing lip may comprise a free end region, and a connector region, wherein the free end region is of wider section than the connector region. The connector region connects the free end of the sealing lip to the main structure of the cuff body, and the free end region may be arranged to be resiliently deflected in relation to said main structure. The resilient sealing lip may be of tapered sectional shape.

At the distal end of the cuff body at which the resilient sealing lip may be provided, and extending inwardly of the cuff body, there is provided a thickened/wider wall portion, and the resilient sealing lip is attached to the thickened portion. The thickened portion may be understood as supporting the resilient sealing lip. The resilient sealing lip may be attached to radially inner region of the thickened portion. The thickened portion may only extend for part of the overall length of the cuff body. The thickened portion may be viewed as a wall portion of the cuff body of increased thickness, in a radial direction, as compared to an adjacent wall portion of the cuff body which is of reduced thickness.

Therefore, the cuff body may comprise a wall structure comprising two adjacent wall portions, one of which is thicker than the other.

Where a connector portion serves to connect the free end region of the sealing lip to the main structure/carcass of the cuff body, the connector portion may be attached to the thickened portion. The connector portion may be of ring or annular shape.

The cuff body may be viewed as comprising a seal sub-assembly/sub-structure which comprises the thickened portion and the resilient sealing lip.

The resilient sealing lip may be resiliently deflectable relative to the thickened wall portion.

The cuff body may be formed of a flexible or pliable material. The cuff body may be resiliently deformable. The cuff body may be formed of an elastic polymeric material.

The cuff body may be formed of a rubber material.

The cuff body may be formed of a non-rigid material.

The cuff body may comprise a wall of which the outer surface is cylindrical.

The application of an external force may to some extent change/distort the shape of the cuff body, and the cuff body may to some extent conform to a shape of an object which applies the external force, but when the force is removed, the cuff body returns to its initial shape/form. The cuff body may be viewed as being compressible.

The glove insert is capable of being received in the internal space of the cuff body. In use, a glove in which a glove insert is provided, is arranged to be push-fit into a (sealing) position in the cuff body. When in a sealing condition, the cuff body and the glove insert may be described as mated or locked to each other.

The invention may be viewed as a liquid-tight cuff system for (re-useable) protective jackets and coveralls, which is compatible with (single-use or disposable) gloves of different material thicknesses.

A further aspect of the invention comprises a garment, the sleeves of which are fitted with respective cuff bodies of the first aspect of the invention.

Any of the above aspects of the invention may comprise, either singularly in combination, one or more features described in the description and/or shown in the drawings. This disclosure includes that any features disclosed either in the description below and/or in the accompanying drawings can be used to supplement any of the above aspects, and for such purpose none of those features, individually, is inextricably linked to any other such feature, notwithstanding that multiple features may be disclosed in the context of a particular embodiment.

BRIEF DESCRIPTION OF THE DRAWINGS

The following drawings show one embodiment of the invention, by way of example only, and are described, along with other embodiments, in the description below.

DETAILED DESCRIPTION

There is now described a novel apparatus for effecting a seal between an arm sleeve of a garment and a glove. In overview, the apparatus comprises two components, one of which is to be inserted into a glove, and second is a cuff piece which is affixed to the opening an arm sleeve of a garment. As is described in more detail below, the apparatus achieves a reliable seal, and ensures comfort for the wearer.

Figure 1:
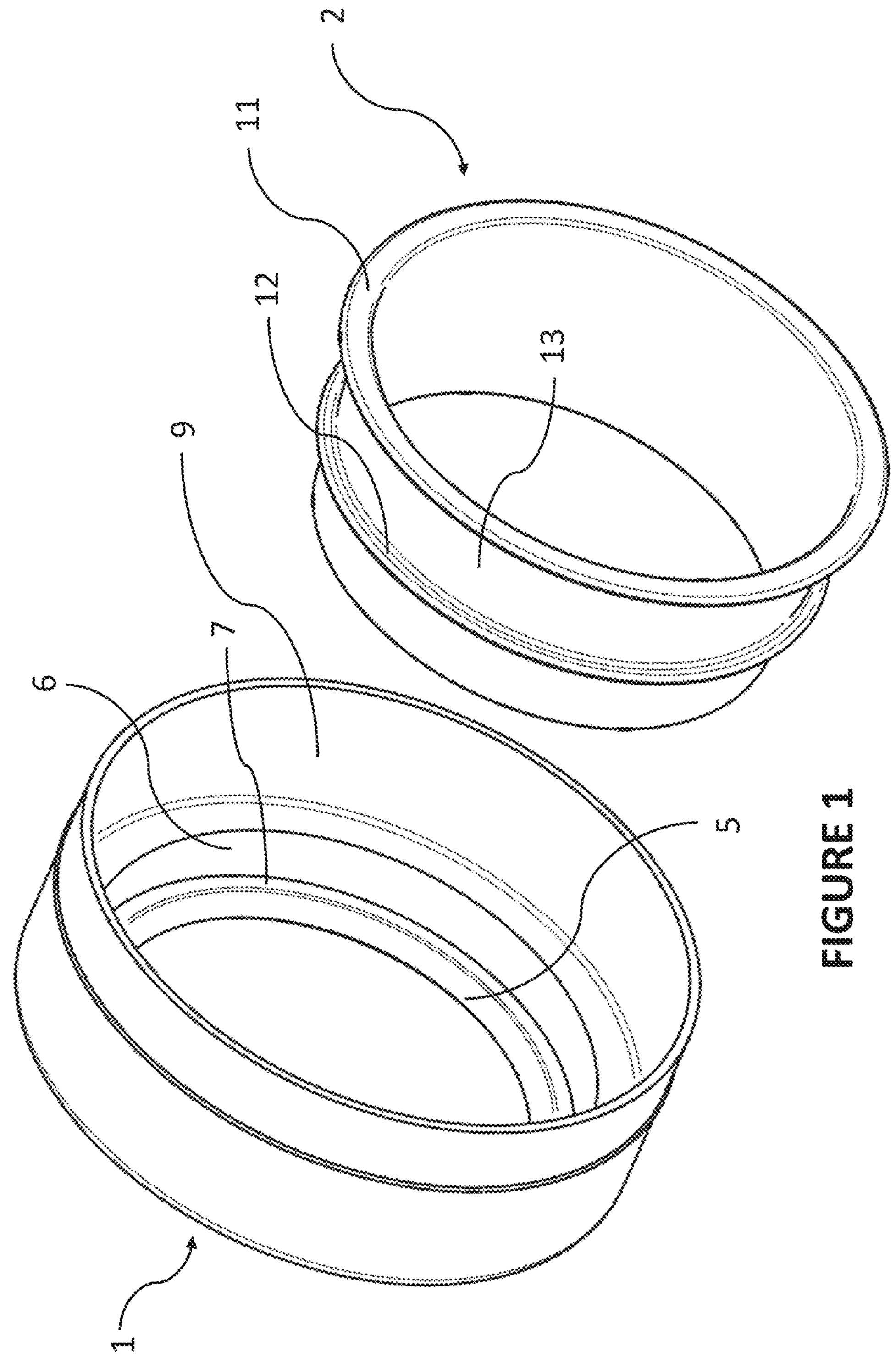
FIG. 1 is a perspective view of a cuff body and a glove insert.

With reference to FIG. 1 there is shown an apparatus comprising a cuff body 1 and a glove insert 2. Both elements are of open-ended hollow construct.

Figure 2:
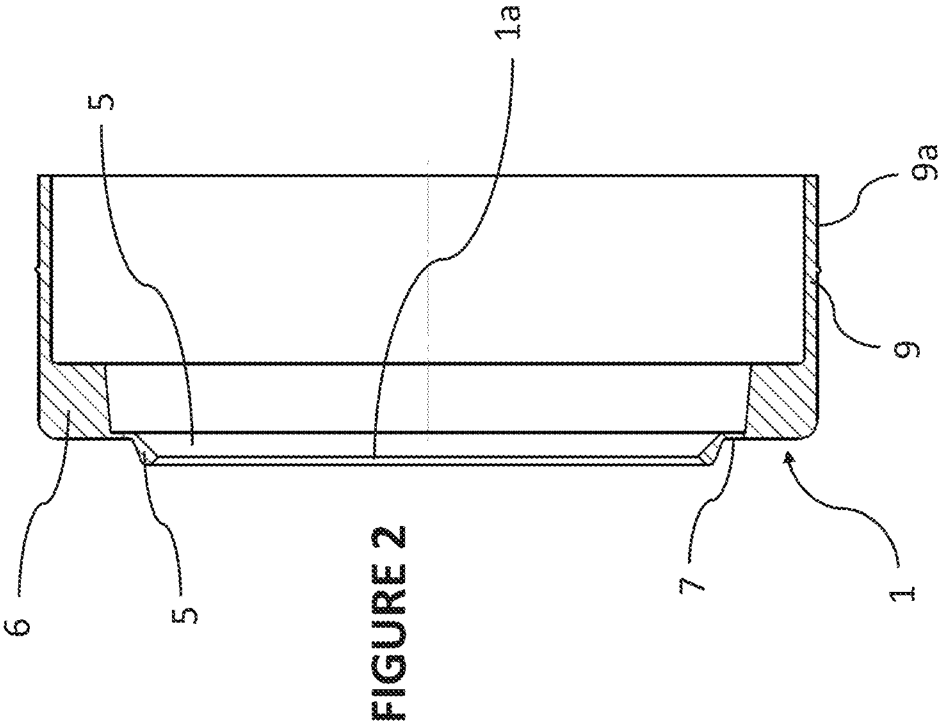
FIG. 2 is a cross-section of the cuff body of FIG. 1 along a central longitudinal axis.

With reference to FIG. 1 and FIG. 2, the cuff body 1 at a (forward) distal end thereof comprises a sealing lip 5. The sealing 5 lip is of circular shape and defines an opening 1*a* at the respective distal end. As best seen in FIG. 2, the sealing lip is of tapered shape, when viewed in radial cross-section. In this, the free-end region is of greater width as compared to its fixed end region. The fixed end region comprises a connector or junction 7 which connects the lip to a support structure 6. The support structure 6 comprises a wall of greater thickness as compared to the adjacent cylindrical wall portion of the cuff body. The junction 7 allows for the free-end region of the sealing lip to be resiliently deflectable relative to support structure 6. In an unbiased condition, the sealing lip 5 is oriented at an incline (of approximately forty-five degrees), as is best shown in FIG. 2.

The external shape of the cuff body 1 is essentially cylindrical, and as mentioned above, the cuff body 1 further comprises a wall portion 9 of lesser thickness. The outer surface of the wall portion 9 includes a roughened or abraded surface 9*a* to facilitate the bonding of an arm sleeve of a garment thereto.

Figure 4:
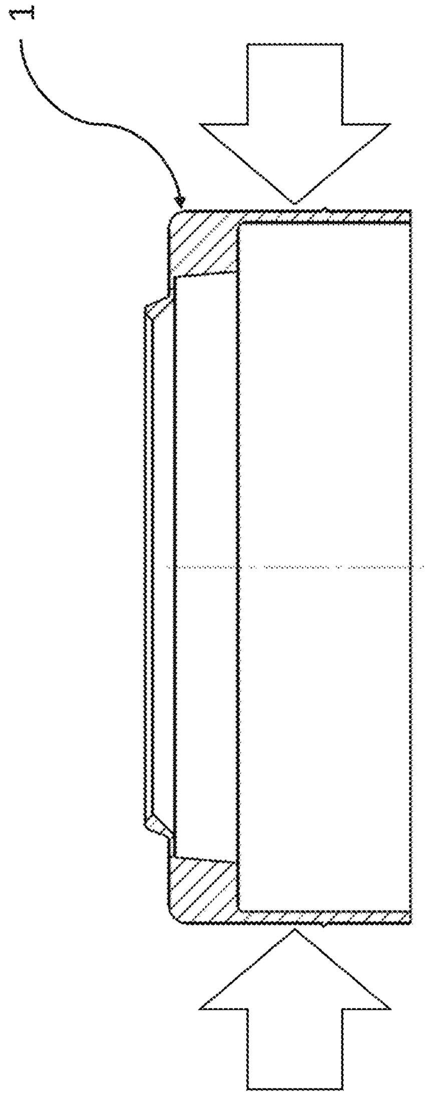
FIG. 4 shows schematically compressive forces applied to the cuff body of FIG. 1.

The cuff body 1 is made from an elastomeric material, such as rubber, or similar. This imparts a resiliently deformable attribute. For example, and with reference to FIG. 4, if two opposing compression forces are applied to the cuff body 1, as depicted by the two arrows, it will adopt a deformed condition, as long as the forces remain. Once the forces are removed the cuff body will return to its initial, unbiased condition.

Turning to the glove insert 2, this is of frusto-conical shape, having a narrower front distal end and a wider rearward distal end. The forward distal end of the glove insert 2 is the end which is first received by a glove, as will be described in more detail below.

Figure 3:
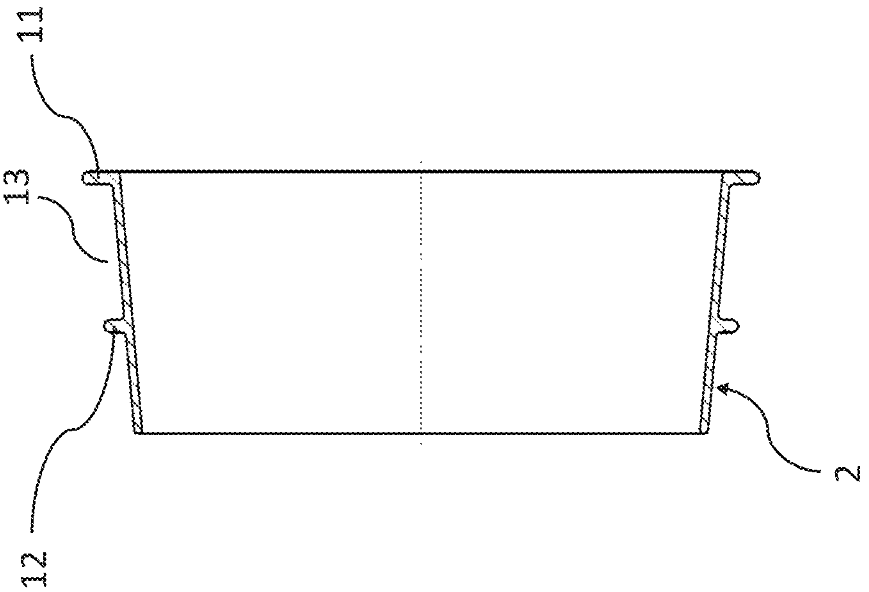
FIG. 3 is a cross-section the glove insert of FIG. 1 along a central longitudinal axis.

The glove insert 2 is provided with two (external) ribs, 11 and 12. Both are of circular shape and extend around the outward facing surface of the insert, and are spaced apart relative to the longitudinal extent of the inert. Intermediate of the ribs 11 and 12, there is defined a gap which forms a channel 13. The rib 11 is located at the rearward distal end, whereas the rib 12 is located between the rearward distal end and the forward distal end. As best seen in FIG. 3, the rib 11 extends further outwards as compared to the rib 12.

Figure 5:
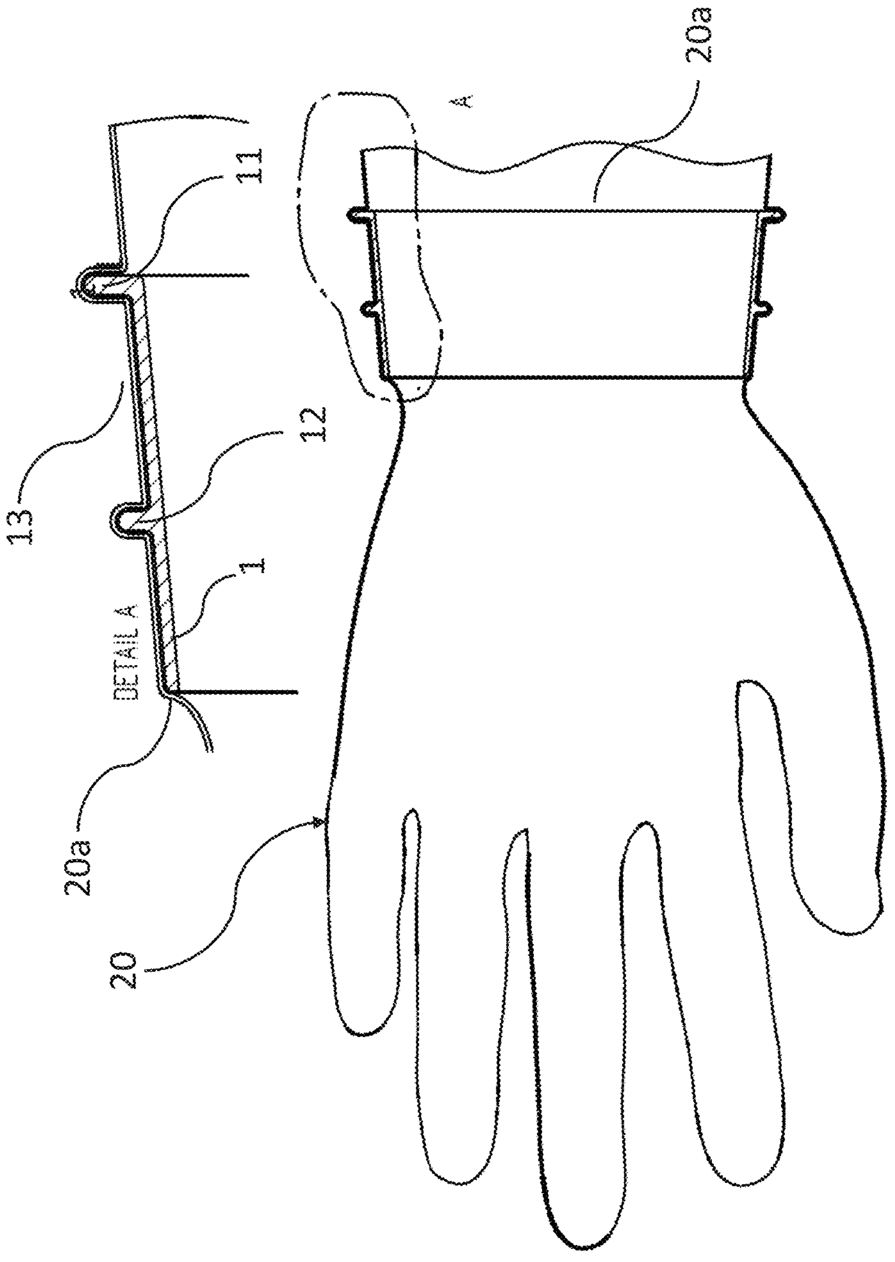
FIG. 5 shows a cross-section of the glove insert received in a glove.

The use of the apparatus is as follows. The glove insert is first fitted into a glove, and reference is made to FIG. 5. This is done by pulling the cuff of a glove over the forward end of the glove insert 2, until the entire insert is within the glove, with the glove cuff material covering the two ribs. This is shown in FIG. 5, and in fact the cuff portion 20*a* of the glove 20 extends beyond the rearward distal end of the glove insert. It can be seen that the glove forms a close fit over the glove insert 2, with the glove material largely conforming to the external shape of the insert, including that of the two ribs 11 and 12. The same process is repeated for a second glove, using a second glove insert.

Figure 6:
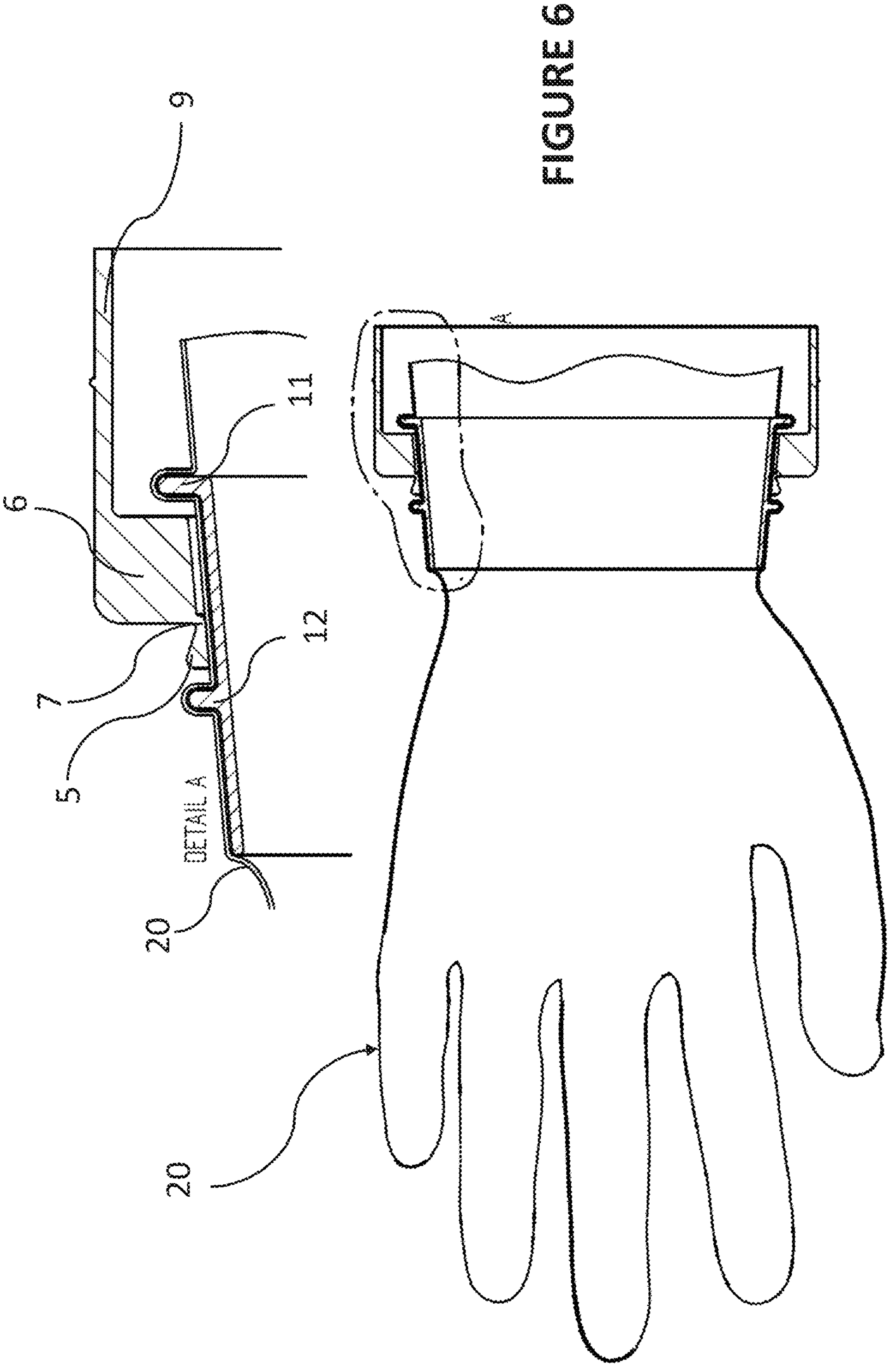
FIG. 6 shows a cross-section of the combination of the glove and glove insert of FIG. 5, received by the cuff body of FIG. 1.

The user the places each hand into each of the respective gloves. The user then inserts each hand through a respective sleeve of a garment. The garment (not illustrated) has affixed to each sleeve opening a cuff body 1. This is achieved by bonding an inner surface of a sleeve to the external surface 9*a* of the cuff body. As the user's hands reach the cuff body 1 at the end of each sleeve, the user is required to push the rib 12, and the glove material which covers the same, past the resilient lip 5. This requires a certain amount of force by the user in order to deflect the lip sufficiently, and can be termed a push-fit. Once this is achieved, the lip 5 locates (or 'snaps') in the channel between the rib 11 and the rib 12, as is shown in FIG. 6. The presence of the support structure 6 and that of the rib 11, prevents the user from pushing the glove beyond the cuff body 1.

As can be seen in FIG. 6, the lip 5 engages with the glove cuff material, in a deflected condition. This in essence clamps the glove material between the cuff body and the insert, and so preventing any movement of the glove. Furthermore, the engagement between the lip 5 and the glove material (on the insert 2) forms a fluid seal, and so prevents any fluid from entering into the sleeves of the garment. As is also evident from FIG. 6, the channel 13 accommodates both the seal lip 5 (in a deflected condition) as well as the thickened wall portion, 6. The rib 11 being of increased height serves to prevent the user inadvertently pushing the glove (with insert) completely through the cuff body, which would then comprise the fluid seal, in view of engagement between the rib 11 and the surface of the thickened wall portion 6. In the condition shown in FIG. 6, the glove and the cuff body can be said to be locked or mated to each other, so that the integrity of the fluid seal in maintained during use, and that the relative position between the glove and the cuff body is fixed. When the user wishes to remove the glove they can simply pull the glove against the cuff body, and so deflecting the lip 5 over the rib 12.

Although in the above described embodiments the insert is disclosed as being removably receivable in the glove, in another embodiment, the insert may be incorporated or integrated with the glove (and so obviating the step of requiring the user to push the insert into a glove).

Advantageously, the above described apparatus can be used with a variety of different gloves from thin- to thick-walled, as well as with thick stitched and flock lined gloves.

The apparatus allows for its flexure during use and so enhances comfort to the user, especially when a wearer is lifting items. The inherent flexure of the apparatus also ensures the integrity of the seal e.g. liquid tightness is retained, should engagement with an external object, such as a heavy weight, cause distortion during use. This may be termed flexural tolerance.

The above described apparatus advantageously allows for rapid and straightforward glove changes, should these be required. This can be contrasted with the known arrangement of wrapping adhesive tape around the sleeve and glove, which is both cumbersome and does not result in a reliable seal being formed.

It will be appreciated that the apparatus may be used in a clinical setting, such as in hospitals, when for example staff may need to wear protective clothing when treating or otherwise in close proximity to an infectious patient. When a staff member is required to place their arm underneath a patient to lift them, the above described cuff body will not dig into the patient's body, but rather will flex and to some extent conform to the area of lifting contact with the patient's body.

The invention claimed is:

1. An apparatus for providing a seal between a sleeve of a garment and a glove, the apparatus comprising:
- a cuff body and a glove insert;
- the cuff body comprising a surrounding wall which defines an internal space, and the cuff body having a first distal open end and a second distal open end;
- the first distal open end comprising a resiliently deflectable sealing lip, which defines an opening of the first distal open end;
- the glove insert is hollow and has a respective opening at each distal end of the glove insert;
- the glove insert comprises an outer surface which is provided with a locating channel which extends around the outer surface;
- the cuff body arranged for attachment to the sleeve of a garment, and the glove insert arranged to be inserted inside a glove,
- the sealing lip arranged to resiliently engage with glove material within the locating channel and thereby seal against the glove material,
- wherein the cuff body includes at the first distal open end of the cuff body a thickened wall portion, and wherein the resilient sealing lip extends from a junction with a radially inner portion of the thickened wall portion, the thickened wall portion forming a first end region and a thinner wall portion forming an opposite end region.

2. The apparatus as claimed in claim 1 in which the locating channel is defined by two spaced apart relief formations.

3. The apparatus as claimed in claim 2 in which the relief formations comprise two ribs, which are spaced apart from each other and extend around the glove insert.

4. The apparatus as claimed in claim 2 in which one of the relief formations has a greater outward extent that the other relief formation.

5. The apparatus as claimed in claim 4 in which one of the relief formations is at or proximal to a rearward distal end of the glove insert, and the relief formation has the greater outward extent.

6. The apparatus as claimed in claim 1 in which the locating channel is provided towards one of the distal ends of the glove insert.

7. The apparatus as claimed in claim 1 in which the glove insert is of substantially frusto-conical shape.

8. The apparatus as claimed in claim 1 in which the resilient sealing lip is located radially inwardly of the cuff body.

9. The apparatus as claimed in claim 1 in which the resilient sealing lip, in an unbiased/undeflected condition, is orientated at an incline.

10. The apparatus as claimed in claim 1 in which the resilient sealing lip circumscribes an opening of the first distal open end of the cuff body.

11. The apparatus as claimed in claim 1, wherein the resilient sealing lip is connected to a radially inner portion of the thickened wall portion.

12. The apparatus as claimed in claim 1 in which an outer surface of the wall structure is of overall cylindrical shape.

13. The apparatus as claimed in claim 1 in which the cuff body is formed of resiliently deformable material.

14. The apparatus as claimed in claim 1 in which the glove insert is configured to be received through the internal space of cuff body, and then into a connected condition to effect the seal by way of a push-fit.

* * * * *